Patented Nov. 16, 1943

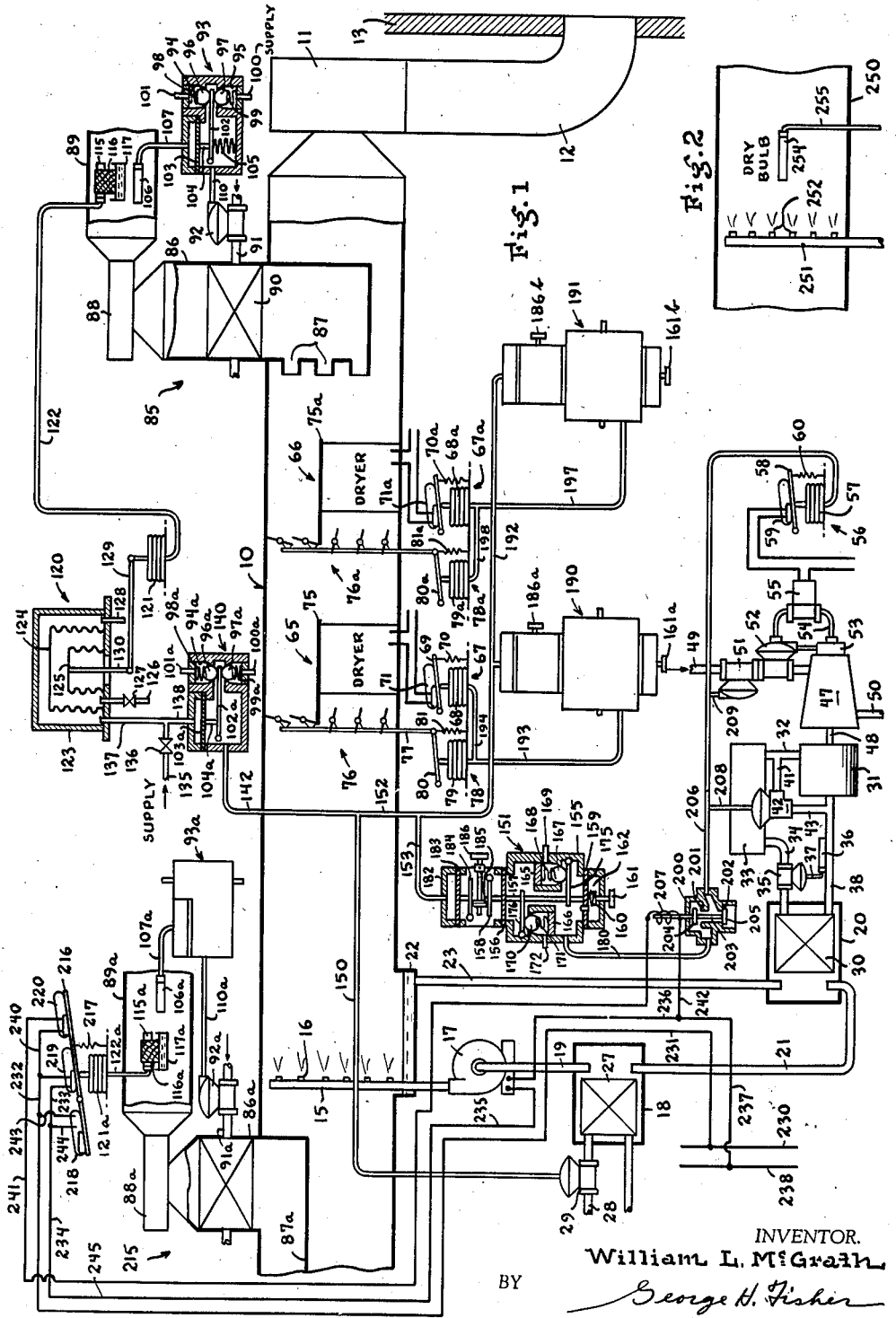

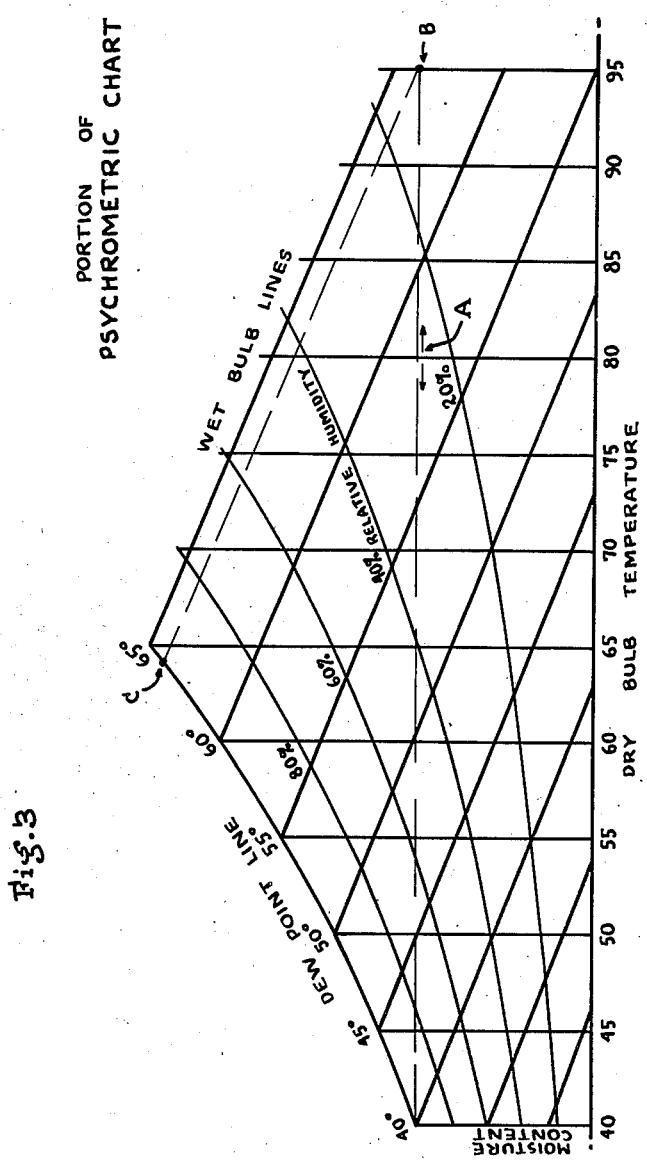

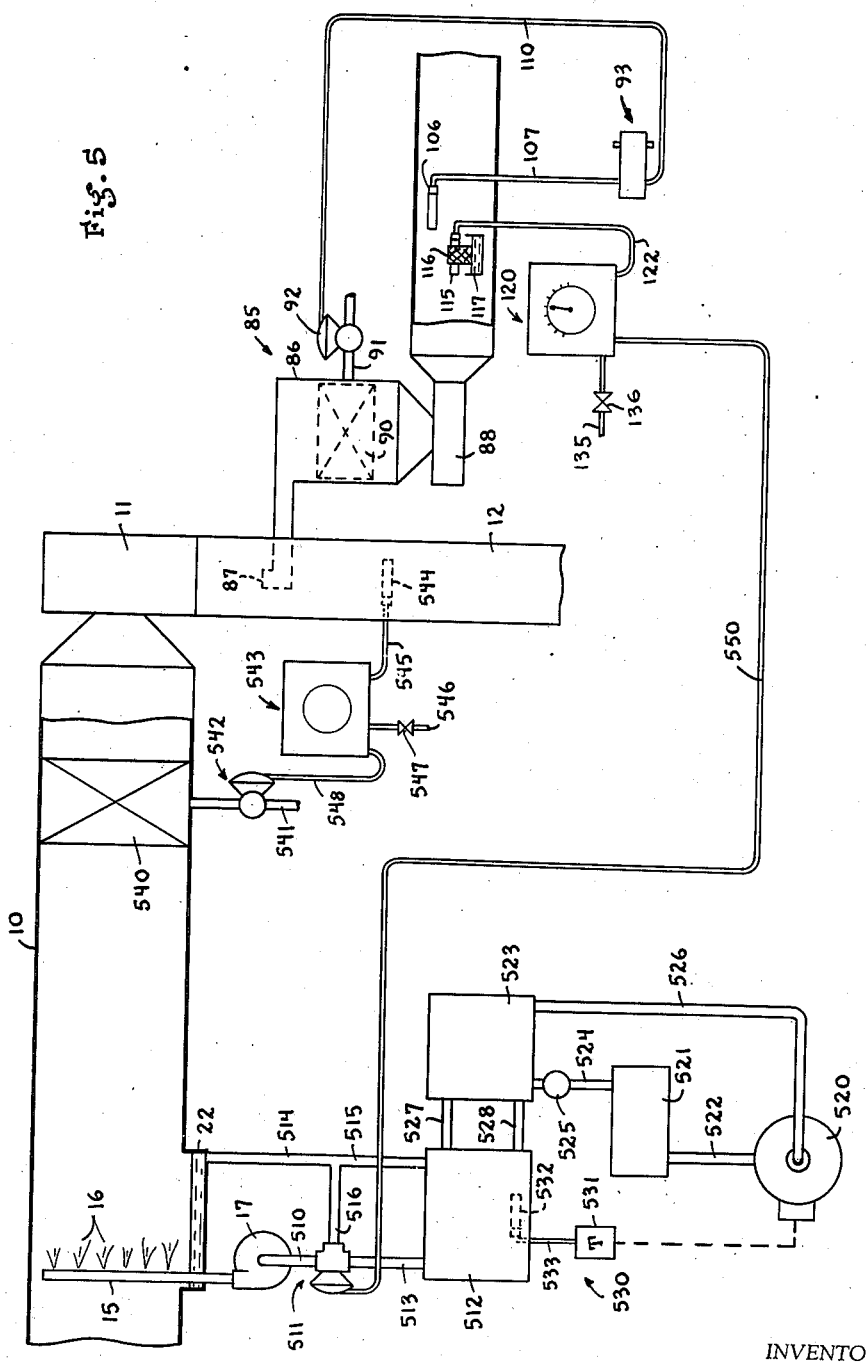

2,334,427

UNITED STATES PATENT OFFICE 2,334,427

DEW POINT CONTROLLER AND DEW POINT SYSTEM

William L. McGrath, Philadelphia, Pa., assignor to Minneapolis-Honeywell Regulator Company, Minneapolis, Minn., a corporation of Delaware Application June 28, 1941, Serial No. 400,284

12 Claims. (Cl. 257—3)

The present invention relates to air conditioning systems and controls, the invention being primarily directed to improved means for measuring the dew point of air and for maintaining the dew point constant over a wide range of loads, under some circumstances the dew point of saturated air and under other circumstances the dew point of unsaturated air. My invention is especially concerned with improved means and methods of measuring the dew point of unsaturated air.

The invention finds a primary application in the control of the dew point of draft air for blast furnaces. Such furnaces use large volumes of draft air which must be raised to a high temperature, and if the air contains a large amount of water vapor a great deal of heat is wasted in raising the temperature of the water vapor. Reduced moisture content of the draft air therefore improves the operating efficiency.

Moreover, the draft fans of the furnace deliver a constant weight of air and if the moisture content varies the amount of oxygen supplied will vary and upset the efficiency of operation, perhaps varying the quality of the product or necessitating changes in the relative proportions of the charge in the furnace. It is very advantageous therefore to maintain the moisture content of the draft air constant.

To maintain the dew point of the draft air it is necessary a great part of the time to dehumidify the air and my invention comprehends utilizing dehumidifying equipment of such nature that with certain arrangements which I employ, the dew point of unsaturated air must be measured; this is more complicated than measuring the dew point of saturated air which may be done merely by measuring its temperature, the wet and dry bulb temperatures then of course being the same and being the dew point temperature. With unsaturated air, however, both the wet and dry bulb temperatures may vary, neither of them being the dew point temperature, and as pointed out my invention is especially concerned with the problem of measuring the dew point of unsaturated air.

Another problem which my invention provides a solution for involves maintaining a constant dew point temperature over a wide range of loads requiring dehumidification of the air and at other times humidification. To suitably vary the capacity of the air treating equipment used, over the range of loads encountered requires throttling in sequence of various control devices. That is, the air treating equipment I use includes artificial refrigeration mechanism, an air drying unit not dependent on cooling and means for directly heating the air or heating water sprayed into the air for humidifying purposes. To properly vary the capacity and effect of the equipment in accordance with the load requires throttling in sequence, the capacity of the refrigeration mechanism, the air passing over the drying unit and the amount of heat supplied.

To include these various sequences within the control differential of an ordinary type of controller controlling the dew point of the air would necessitate a very wide differential resulting in considerable droop, hunting, and undesirably wide variations in the dew point maintained. My invention comprehends the employment of a dew point controller of a type embodying a load compensating feature enabling the controller to handle the various sequences required and still maintain a constant dew point very accurately. The provide this control organization wherein a controller of the type referred to controls a plurality of devices which throttle in sequence is one of the objects of the invention, the result sought for being that of maintaining a condition at a constant value with wide variations in load and corresponding wide variations in capacity of the controlled equipment.

Another object is to provide a control arrangement for air treating mechanism wherein the capacity of an artificial refrigeration machine is first throttled in response to diminishing load, the air passing over a drying unit is then throttled and finally a heat supply controlling means is adjusted in position.

Another object of the invention is to provide an economizer feature in the aforedescribed arrangement which shuts down the artificial refrigeration mechanism in response to the dew point of the outdoor air when the dew point of the outdoor air is such that the dew point of the conditioned air can be satisfactorily maintained by the dryer unit or units.

Another object of the invention is to provide means for maintaining air at constant dew point wherein the air is dehumidified but is not in a saturated state at the point where the dew point is measured.

Another object is to provide means for maintaining the dew point of air constant by varying its moisture content, changing its dry bulb temperature to a predetermined value, and measuring the wet bulb temperature of the air at predetermined dry bulb temperature to determine the dew point, the wet bulb measurement being the factor controlling the amount of variation in moisture content of the air.

Many advantages and additional objects of my invention will become apparent from the following detailed description and annexed drawings wherein:

Fig. 1 represents diagrammatically a blast furnace air supply system embodying a preferred form of the control arrangement of my invention;

Fig. 2 is a slightly modified form of my invention;

Fig. 3 is a reproduction of a portion of a psychrometric chart;

Fig. 5 is a further modified form of my invention.

Figure 4:
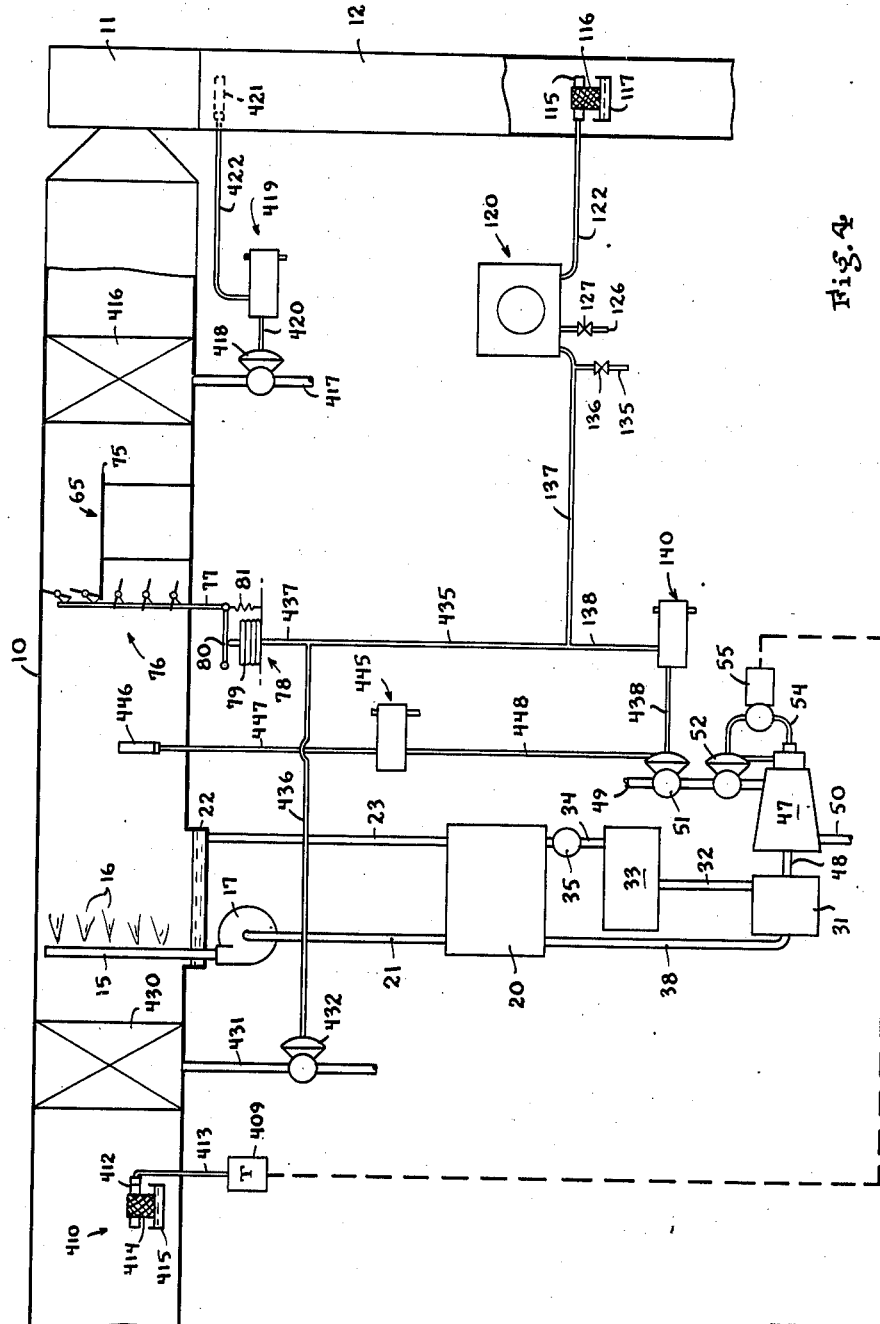
Fig. 4 represents another form of my invention.

Referring to Fig. 1 of the drawings, numeral 10 designates an air conditioning duct the right end of which is connected to the inlet of a fan 11 which discharges through a duct 12 into the interior of a space wherein it is required that the air be at predetermined conditions. In the present adaptation of my invention, the duct 12 discharges into a blast furnace, one wall of which is indicated by the numeral 13, that is the fan 11 supplies draft air for operation of the furnace. Outdoor air is admitted into the duct 10 at its left end.

The mechanism disposed within the duct 10 for treating the air includes a spray device comprising a pipe 15 having spray nozzles 16 through which water may be sprayed into the air passing through the duct 10. The pipe 15 is connected to the discharge of a centrifugal pump 17 which is driven by an electric motor. The inlet of the pump 17 is connected to a tank 18 by a pipe 19. The tank 18 is connected to another similar tank 20 by a pipe 21. The portion of the duct 10 adjacent the sprays 16 is shaped so as to form a collecting pan 22 for collecting the water which passes out of the sprays 16. The pan 22 is connected to the tank 20 by a pipe 23.

Disposed within the tank 18 is a steam coil 27, the purpose of which is to heat the water which is pumped to the sprays 16 when it is necessary to humidify the air in the duct 10. Steam is supplied to the coil 27 through a pipe 28 and interposed in this pipe is a valve 29 which is a pneumatically operated valve of a normally open reverse acting type as will presently appear. The valve is operated by a pressure motor which operates the valve from closed to fully open position when the pressure acting on the pressure motor decreases from 4 pounds per square inch to 2 pounds per square inch, the valve being closed when the pressure is above 4 pounds per square inch. Operation of the valve 29 will be more fully described presently.

Located within the tank 20 is a coil 30 which forms the evaporator of a direct expansion refrigeration system. The purpose of the coil 30 is to cool the water which is supplied to the sprays 16 when it is desired to dehumidify the air being passed through the duct 10, the water which is collected in the pan 22 of course returning to the tank 20 through the pipe 23. Numeral 31 designates a rotary compressor forming part of the direct expansion refrigeration system. The compressor 31 discharges through a pipe 32 into a condenser 33, and the condenser 33 is connected to the coil 30 by a pipe 34 and interposed in the pipe 34 is a valve 35, the valve 35 being a conventional type of thermostatically controlled expansion valve which is arranged to maintain a constant degree of superheat in the outlet of the evaporator, that is, the coil 30. The valve 35 includes a pressure chamber which is connected to a thermal bulb 36 disposed in a position to be responsive to the temperature of the refrigerant leaving the evaporator by a tube 37. As shown, the thermal bulb 36 is located in intimate heat exchange relation with a pipe 38 connecting the coil 30 and the suction side of the compressor 31.

The bulb 36 is filled with a volatile liquid as usual so as to develop an actuating pressure for the valve 35, depending upon the temperature of the refrigerant in the pipe 38.

The refrigerating capacity of the system is controlled in part by a compressor by-pass which includes a pipe 41 connected to a pneumatic by-pass valve 42 and a pipe 43 connecting the valve 42 to the pipe 38. The valve 42 is of the conventional normally open type, this valve closing upon increase in pressure and opening upon a decrease in pressure. Valve 42 is so arranged that it will move from a closed position to a fully open position when the pressure acting on the pressure motor thereof decreases from 6 pounds per square inch to 2 pounds per square inch. The operation of valve 42 will be described in detail hereinafter.

The rotary compressor 31 is driven by a steam turbine 47 by means of a shaft 48. The turbine 47 is supplied with steam through a pipe 49 and the condensate formed in the turbine may be withdrawn therefrom through a pipe 50. The supply of steam to the turbine is controlled by a pneumatic valve 51 which is another pneumatically operated valve, this valve being of the normally closed type opening upon an increase in pressure acting on the pressure motor of the valve. Valve 51 does not completely close the pipe 49 but it has a minimum position admitting a minimum amount of steam through the pipe 41 and it moves between this minimum position and a wide open position. The valve 51 is arranged to move from its minimum position to a wide open position when the pressure affecting the valve increases from 6 pounds per square inch to 13 pounds per square inch, the valve 51 moving from a wide open position to a minimum position when the pressure affecting the operating motor of the valve decreases from 13 pounds per square inch to 6 pounds per square inch.

Also interposed in the pipe 49 is a hydraulic valve 52 which is a normally open valve arranged to close upon an increase in pressure acting on the operating motor of the valve. At the right end of the turbine 47 is a small hydraulic gear pump 53 for pumping a hydraulic fluid through a tube 54 into the operating motor of valve 52. The pressure delivered to the valve 52 in this manner depends upon the speed at which the gear pump is driven by the turbine 47 and as the speed increases the pressure increases tending to move the valve 52 in a closing direction so that the valve 52 acts as a governor valve and tends to maintain the turbine in operation at a constant speed. Interposed in the pipe 54 is a solenoid valve 55 which is controlled by a pressure switch 56. When the solenoid valve 55 is open, the valve 52 acts normally to govern the speed of the turbine 47 and when the valve 55 closes obstructing the tube 54, the governor action is discontinued.

The pressure switch 56 comprises an expansible and contractible bellows 57, the movable end of which carries a stem engaging a pivoted arm 58 carrying a mercury switch 59. The arm 58 is normally biased in a clockwise direction by a coil spring 60. The bellows 57 expands when the pressure therein increases and the switch is arranged to be closed when the pressure within the bellows is at or above five pounds per square inch. When the pressure within the bellows decreases to two pounds per square inch, it contracts sufficiently to open the mercury switch 59.

More particular reference will be made to the switch 56 hereinafter.

The purpose of the sprays 16 when they are refrigerated is to substantially saturate the air in the duct 10. In carrying out my invention, it is desired to maintain the air being admitted to the blast furnace at a constant dew point temperature. The dew point temperature of the treated air must therefore be measured and if only the sprays 16 were used the dew point temperature could be measured merely by measuring the dry bulb temperature of the saturated air. The efficiency of operation of the system can be improved, however, be removing some of the moisture from the air after it has been saturated by the sprays 16. To provide for removing additional moisture, my system embodies drier units indicated by the numerals 65 and 66. The unit 65 is a commercial type of air drying unit which does not rely upon artificial refrigeration. A type of unit which may preferably be used in my invention comprises an endless belt carrying absorbent material for taking up moisture from air which passes over the material. This type of unit additionally embodies a means for removing moisture from the absorbent material in order to reactivate it so that it can be used over and over again to remove moisture from the air. The mechanism of the dryer unit is driven by an electric motor not shown and this motor is controlled by a pressure switch designated by the numeral 67. Switch 67 comprises an expansible and contractible bellows 68, the movable end of the bellows carrying a stem into engagement with which a pivoted arm 69 is normally urged by a coil spring 70. The arm 69 carries a mercury switch 71 which is closed when the pressure in the bellows 68 is at or above five pounds per square inch so as to expand the bellows. The mercury switch 71 opens when the pressure within the bellows 68 decreases to two pounds per square inch. Mercury switch 71 controls the motor of unit 65 through the circuit shown.

The dryer unit 65 is so arranged in the duct 10 that some of the air may be by-passed past the unit above a partition member 75. The relative proportions of air which pass over the dryer unit and which are by-passed is controlled by face and by-pass dampers 76 which are operated through an arm 77 by means of a damper motor 78. The damper motor 78 comprises an expansible and contractible bellows 79, the movable end of which has a stem into engagement with which a pivoted lever arm 80 is normally urged by a coil spring 81, the end of the lever 80 being connected to the arm 77. When the bellows 79 expands, the lever 80 is moved in a counter-clockwise direction and the arm 77 is moved upwardly in a direction to adjust the face and by-pass dampers to cause more air to pass over the dryer unit and less through the by-pass. The damper motor 78 is so arranged that when the pressure in the bellows 79 increases from two pounds per square inch to thirteen pounds per square inch the face and by-pass dampers are moved from a position wherein substantially all of the air is being by-passed to a position as shown wherein substantially all of the air is passing over the dryer unit.

More particular reference will be made to the switch 67 and the damper motor 78 hereinafter.

The dryer unit 66 is exactly the same as the dryer unit 65. If desired, more dryer units of the same or similar type may be used. The controls associated with the dryer unit 66 correspond to and are identical with those of the unit 65, and the elements of these controls are therefore identified by the same reference numerals with the distinguishing characteristic letter a.

As pointed out above, in the system of my invention it is necessary to measure the dew point of the treated air, and when the air is saturated its dew point is of course its dry bulb temperature which can be conveniently and easily measured. However, in my system inasmuch as I find it desirable to remove further moisture from the air after it has been saturated, it becomes necessary to measure the dew point of the unsaturated air. The dew point temperature of the unsaturated air is neither its wet bulb temperature nor its dry bulb temperature and both of these temperatures may vary in my arrangement. To measure the dew point of the unsaturated air I have provided a sampling unit designated generally by the numeral 85. The unit 85 comprises a duct 86, the lower part of which extends into the duct 10 and has opening 87 through which a relatively small part of the air passing through the duct 10 is admitted into the duct 86 and passes upwardly therethrough. The upper end of the duct 86 is connected to the inlet of a fan 88 which discharges into a duct 89. Disposed in the duct 86 is a steam coil 90 to which steam is admitted through a pipe 91. Interposed in the pipe 91 is a pneumatic valve 92 of the normally open type which closes upon an increase in pressure in the operating motor of the valve. The valve 92 is controlled by a pneumatic thermostat 93 which may be of the conventional type. As I have shown the thermostat 93, it comprises a casing and near the right end of this casing are formed a valve chamber 94 and a valve chamber 95. Within the valve chamber 94 is a ball valve 96 associated with a port communicating with the interior of the casing. Within the valve chamber 95 is a ball valve 97 associated with a port providing communication with the interior of the casing. The ball 96 is urged toward its associated port by a coil spring 98 and the ball 97 is urged to its associated port by a coil spring 99. Connected to the chamber 94 is a pipe 100 through which air is supplied at 15 pounds pressure from a source of pneumatic supply. Air may be exhausted from the chamber 95 through a pipe 101. The valve ports are of such size that the ball valves extend part way through the ports to a position adjacent each other and interposed between the balls 96 and 97 is the end of a pivoted lever 102 which is pivoted within the casing of the thermostat. A small portion of the casing 93 is sealed off by a flexible diaphragm 103 which forms a diaphragm chamber above it and the central portion of this diaphragm is connected to the lever 102 by a stem 104 so that when the pressure within the diaphragm is increased the diaphragm tends to move the lever 102 downwardly against the force of a coil spring 105 which normally urges the lever upwardly. The diaphragm chamber above the diaphragm is connected to a thermal bulb 106 disposed in the duct 89 by a tube 107. The thermal bulb 106 is filled with an expansible liquid which expands and contracts in accordance with the dry bulb temperature of the air in duct 89 producing a corresponding pressure in the diaphragm chamber. When the temperature of the air in duct 89 increases, the pressure in the diaphragm chamber increases correspondingly and the lever 102 is moved downwardly, this action moving ball 97 downwardly away from its seat permitting air to be admitted to the casing of the thermostat through the chamber 95 and pipe 100 so as to increase the pressure therein until the upward pressure on the diaphragm balances the downward pressure. The interior of the casing of the thermostat is connected to the operating motor of the valve 92 by a tube 110 so that when the pressure within the casing of the thermostat is thus increased, the pressure affecting the operating motor of valve 92 is increased and the valve thus moves in a closing direction by an amount depending upon the change in pressure. On the other hand, when the temperature affecting bulb 106 decreases the pressure in the diaphragm chamber decreases and lever 102 is moved upwardly so that ball 96 is moved away from its seat permitting pressure to be released from the casing of the thermostat through chamber 94 and pipe 101 until the pressures on opposite sides of the diaphragm are balanced. This decrease in pressure is communicated to the operating motor of valve 92 tending to move the valve in opening direction. In the manner described the thermostat 93 and its associated bulb control the valve 92 so as to maintain a constant dry bulb temperature in the duct 89 and my arrangement is such that the thermostat 93 will maintain the dry bulb temperature of the air in duct 89 at a constant value of 95° F.

Now in order to measure the dew point of the air in the duct 10, I measure the wet bulb temperature of the air in the duct 89. As explained above, the air in duct 89 is kept at a constant dry bulb temperature and thus, as will now be explained, the wet bulb temperature of the air in duct 89 will be a measure of the dew point of the air in duct 10.

Assume that it is desired to maintain the air going to the blast furnace at a constant dew point temperature of 40° F. This constant dew point temperature means in other words a constant moisture content of the air. As already explained, both the wet and dry bulb temperature of the air in the duct 10 beyond the dryer units may vary. Assume now, as pointed out, that the air in the duct 10 beyond the dryer units is at a dew point temperature of 40° F., and at a dry bulb temperature of 80°. The condition of the air is represented by the point A on the psychrometric chart of Fig. 3. (See Fig. 3.) The air which is taken into the sampling unit is heated to a constant dry bulb temperature of 95° and so this air is represented by the point B on the psychrometric chart inasmuch as its moisture content has not been changed. The wet bulb temperature of the air passed through the sample unit, that is, the air represented by point B is read at point C on the chart, this wet bulb temperature being substantially 63.5° F. Now it can be seen that if the dry bulb temperature of the air in the duct 10 varies without change in moisture content, point A will move to the right or left on the chart but the position of point B will not be affected because the air represented by point B is always at a constant dry bulb temperature. Thus variations in dry bulb temperature of the air in duct 10 will not affect point B and will have no effect on the wet bulb reading, that is, point C. On the other hand, if the moisture content of the air in duct 10 beyond the dryer units varies, the position of point A will move up or down and correspondingly the position of point B will move up or down. When point B moves up or down the wet bulb reading will of course be different, that is, point C will move in accordance with the movements of point B. Thus the wet bulb reading is a measure of the absolute humidity or the dew point temperature, that is, it can be readily seen from the foregoing that if the wet bulb temperature is maintained at 63.5° F., that is, at point C, and point B is maintained at a fixed position the horizontal line passing through the 40° temperature on the dew point line of the chart will always pass through points A and B. In other words, if the wet bulb temperature in duct 89 is maintained constant and the dry bulb temperature constant, it follows that the dew point of the air in duct 10 remains at a constant value.

The mechanism for measuring the wet bulb temperature includes a thermal bulb 115 disposed in the duct 89. Draped over the thermal bulb is a wick 116 made of a porous fabric, the lower edges of this wick depending into a pan of water 117 so that water is carried upwardly through the wick by capillary attraction and this water evaporates in the vicinity of the thermal bulb so as to depress its temperature below the dry bulb temperature by an amount depending upon the amount of moisture in the air. The wet bulb 115 is arranged to control a controller 120, this controller including an expansible and contractible bellows 121 which is connected to the bulb 115 by a tube 122. The controller 120 is shown diagrammatically and represents a form of the controller disclosed in detail in the patent to Harrison 2,124,946. As will be presently explained, the controller 120 controls the turbine driving the compressor, the compressor by-pass, the dryer units, and the steam coil 27 in a manner to so treat the air that a constant dew point will be maintained. These various devices must be throttingly controlled in sequence and thus the controller 120 which is of the pneumatic type must be able to develop a rather wide range of controlling pressures, depending upon load requirements. For efficient operation of the blast furnace it is also required that the controller 120 be operable to maintain accurately a constant dew point temperature of the air. The controller 120 therefore, as will now be explained, is of a type embodying an automatic reset feature or load compensating feature so that it is self-compensating for variations in load whereby a desired dew point temperature may be maintained considerably more accurately.

The controller 120 comprises a casing 123 within which is an expansible bellows 124. Within the bellows 124 is a second bellows 125 and the space between the two bellows elements communicates with the atmosphere through a tube 126 having a restriction 127 therein. Numeral 128 designates a tube having a bleed port therein communicating with the interior of the casing 123 outside of the bellows 124. Adjacent the bleed port 128 is a member 129 forming a flapper valve, one end of this member being connected to the operating stem of bellows 121 and the other end being connected to a stem 130 actuated by the movable end of bellows 125. Pneumatic pressure is supplied from a source of supply at a regulated value of 15 pounds pressure through a pipe 135 having a restriction 136 therein. The pipe 135 communicates with a pipe 137 connected to the casing 123 exteriorily of the bellows 124. The pipe 135 also communicates with a pipe 138 connected to the diaphragm chamber of a pneumatic relay 140, which relay structurally takes exactly the same form as the pneumatic thermostat 93 with the exception of the coil spring 105. The elements of the relay 140 are therefore designated by the same reference numerals as the corresponding elements of the thermostat 93, the elements of relay 140 having the distinguishing letter a. The pipe 135 also communicates with pipe 100a connected to the chamber 97a of relay 140. The interior of the casing of relay 140 has a pipe 142 connected thereto through which pressure at a controlled value is delivered to various control devices, as will presently be described.

The function of the controller 120 is to deliver a certain pressure to the relay 140 depending on the wet bulb temperature in duct 89, and the relay 140 in turn delivers a corresponding pressure through the pipe 142. In operation, assuming that there is a drop in wet bulb temperature affecting the bulb 115 the pressure in bellows 121 will be decreased causing it to contract, moving flapper 129 away from bleed port 128. This will increase the rate of bleed through the bleed port 128, it being understood that air is constantly bled through the restriction 136, pipe 135, and pipe 137 into the interior of casing 123 and into the diaphragm chamber of relay 140. As the pressure in casing 123 exterior of bellows 124 is thus decreased the bellows 124 will expand slightly, decreasing the pressure in between the two bellows elements and bellows 125 will expand in turn moving the left end of the flapper 129 upwardly so as to neutralize a part of the movement imparted to member 129 by bellows 121. When the pressure within the two bellows elements is decreased by expansion of bellows 124, atmospheric air will bleed through pipe 126 and restriction 127 into the space between the two bellows elements so that the pressure therein will tend to reach atmospheric pressure. Thus as the atmospheric pressure bleeds into the space between the two bellows elements, bellows 125 will again be compressed to some extent so as to tend to move the flapper 129 back toward the position into which it was moved originally by bellows 121. The decrease in pressure within the casing 123 occasioned by the drop in wet bulb temperature will be transmitted to the relay 140 which operates in the same manner as thermostat 93, and to various control devices, as will be presently described so as to affect the air treating apparatus in a manner to increase the wet bulb temperature to the proper value. Thus after the control impulse has been transmitted the wet bulb temperature will tend to increase again so as to cause the bellows 121 to expand, moving the right end of member 121 upwardly while its left end is still perhaps being moved downwardly by bellows 125. From the foregoing, it is to be seen that a change in wet bulb temperature will cause first, a response by the controller 120 which is partly neutralized by the action of bellows 125 and then the change in the wet bulb temperature resulting from the impulse transmitted to the air treating apparatus is governed by the contracting action of bellows 125. Both ends of the flapper 129 can move independently and the flapper will take a position with respect to the bleed port 128 depending upon the load being carried by the air treating apparatus, only very slight variations in wet bulb temperature being necessary to cause the controller 120 to transmit impulses to control the air treating apparatus in accordance with load requirements therein.

The pipe 142 previously referred to is connected to the valve 29 by a pipe 150 and it is connected to a pneumatic relay 151 by a pipe 152 and another pipe 153. The pneumatic relay 151 controls the valves 42 and 51 and the switch 56; as will presently be described, the relay 151, in response to the controller 120 upon decreasing dehumidifying requirements first throttling the supply of steam to the turbine, then opening the compressor by-pass valve and finally opening the switch 56. On decreasing demands for dehumidification after the operation just described, the dampers associated with the dryer units are next actuated and finally the steam coil 27 is turned on, as will presently be described.

The relay 151 comprises a casing 155, the upper part of which is sealed by a flexible diaphragm 156. Within the casing is a longitudinal stem 157, the upper end of which extends through the diaphragm 156 and is connected to a pivoted lever 158. The lower end of stem 157 is connected to another diaphragm 159, and this diaphragm is normally urged upwardly by a manually adjustable coil spring 160 adjustable by a manual knob 161, the spring being enclosed within a cup-shaped member 162, the edges of which engage the diaphragm of 159. The casing 155 is internally constructed so as to form a valve chamber 165 and a valve chamber 166. Within the valve chamber 165 is a ball 167 associated with a port forming a valve seat, there being a coil spring 168 normally urging the ball 167 towards its seat. Pressure may flow from the interior of the casing 155 through the valve formed by ball 167 and to atmosphere through a pipe 169.

Within the chamber 166 is a ball 170 associated with a seat to form a valve, this ball being urged towards its seat by a coil spring 171. Pressure at 15 pounds per square inch may be admitted to the chamber 166 through a pipe 172 and this pressure may be communicated to the interior of casing 155 when the ball 170 is moved away from its seat. Numeral 175 designates a pivoted lever attached to the stem 157 and engaging the ball 167. Numeral 176 designates a similar pivoted lever engaging the ball 170, and also attached to the lever 157. When the stem 157 is moved downwardly against the force of spring 160, the ball 167 remains seated but lever 176 moves ball 170 away from the seat to admit pressure from pipe 172 to the interior of casing 155, and this pressure is delivered to a pipe 180 connected to the casing 155. When the stem 157 moves upwardly the ball 170 remains seated but lever 175 moves ball 167 away from its seat to permit pressure to be exhausted from casing 155 to atmosphere. Thus the pressure within the casing 155 and delivered to the pipe 180 depends upon the movements of stem 157.

The pipe 153 communicates with a diaphragm chamber formed by a member 182 and a diaphragm 183. The diaphragm 183 is connected to a pivoted lever 184 corresponding to the lever 158, and interposed between these levers in abutting relation to both of them is a member 185 in screw-threaded relationship with a manually adjustable screw 186 having a manual knob at its end whereby the position of the member 185 may be adjusted back and forth with respect to the levers 184 and 158, the purpose of the adjustable member being to vary the amount of force with which lever 184 is urged downwardly by the diaphragm 183 relative to the force with which lever 158 is urged upwardly by diaphragm 156 which is exposed to the pressure within casing 155. Thus when the member 185 is to the left of stem 157 as shown, the lever 184 has greater leverage effect that is, it has a mechanical advantage over the lever 158. The pressure in the member 182 required to initially move the stem 157 downwardly against the force of spring 160 depends upon the adjustment of this spring. When stem 157 has been moved downwardly to move ball 170 away from its seat admitting pressure to the interior of casing 155 a balancing pressure will be developed within casing 155 which acting on diaphragm 156 will again move the stem 157 upwardly permitting ball 170 to be again moved against its seat. The ratio between the pressure in member 182 and the pressure in casing in 155 will thus depend upon the position of member 185 which, as explained above, determines the relationship between the downward force exerted by diaphragm 183 and the upward balancing force exerted by diaphragm 156. As respects the relay 151, the spring 160 is so adjusted that the pressure in pipe 153 must increase to eight pounds per square inch before the pressure is sufficient to move stem 157 downwardly for moving ball 170 away from its seat to admit pressure to the interior of casing 155. The member 185 is so adjusted that as the pressure acting on diaphragm 183 increases from 8 pounds per square inch to 13 pounds per square inch the pressure within casing 155 will be increased from 2 pounds per square inch to substantially 13 pounds per square inch. In other words, the ratio of pressure change between pipe 153 and the interior of casing 155 is 5 to 11. In the opposite manner when the pressure affecting diaphragm 183 is decreased from 13 pounds per square inch to 8 pounds per square inch the pressure delivered to pipe 180 will be decreased from 13 pounds per square inch to substantially 2 pounds per square inch.

Numerals 190 and 191 designate two more pneumatic relays which are exactly like the relay 151 so that they have not been shown in detail. The adjusting knobs of these relays are numbered the same as those of relay 151 with identifying characteristic letters a and b. Pressure is delivered to the diaphragm chamber of relays 190 and 191 through a pipe 192 connected to the pipe 152. The relay 190 delivers a controlled pressure to a pipe 193 connected to the bellows 79 of damper motor 78 and through a pipe 194 to the bellows 68 of switch 67. In other words, the relay 190 controls the dryer unit 65. The relay 190 is adjusted differently than the relay 151 so that when the pressure delivered to relay 190 changes between 7 pounds per square inch and 9 pounds per square inch the pressure delivered to the damper motor 78 and switch 67 varies between 2 pounds per square inch and 13 pounds per square inch.

The relay 191 delivers a controlled pressure through a pipe 197 to the bellows 68a of pressure switch 67a and through pipe 198 to the bellows 79a of damper motor 78a. In other words, relay 191 controls the dryer unit 66. The relay 191 is adjusted differently than the relay 151 so that when the pressure delivered to relay 191 varies between 6 pounds per square inch and 8 pounds per square inch the pressure delivered to the damper motor 78a and switch 67a varies between 2 pounds per square inch and 13 pounds per square inch.

Referring again to relay 151, the pipe 180 connected to the interior of this relay is connected to an electromagnetic valve 200. This valve has a longitudinal passageway therein forming an upper valve seat 201 and a lower valve seat 202. The valve stem 203 carries an upper valve member 204 cooperative with the upper seat and a lower valve member 205 cooperative with the lower seat. A pipe 206 is connected to the valve 200 so as to be in communication with the longitudinal passageway in the valve, that is, the space between the two valve seats. As is obvious, the valve 200 is a three-way valve and when the stem is in its upper position with the lower valve member on its seat, pressure may pass through the valve from pipe 180 to pipe 206. When the valve stem 203 is in its lower position the upper valve member is on its seat and the lower valve member is away from its seat so that under these circumstances pressure can bleed from pipe 206 through the lower valve and to atmosphere. The upper end of the valve stem forms an armature for an operating coil 207 associated therewith and when this coil is energized the valve stem is in the position shown on the drawing.

The pipe 206 is connected to the valve 42 by a pipe 208 and to the valve 51 by a pipe 209. The pipe 206 is also connected to the bellows 57 of switch 56.

From the foregoing it is to be seen at this time that the dew point of the air being admitted to the blast furnace is controlled in response to the wet bulb temperature at the sampling unit 85, the dew point being maintained by controlling the mechanical refrigerating system, the dryer units and the heating coil for the water sprays. Under some circumstances, the dew point temperature of the outdoor air or of the air being treated may be low enough so that the dew point of the air being admitted to the blast furnace can be maintained by the dryer units without use of the mechanical refrigeration system. In the system disclosed, if the air passing to the dryer units is at a dew point temperature of 57° F., the dew point temperature beyond the dryer units will be 40° F., which is the value selected as the one to be maintained. Thus when the dew point temperature of the outdoor air falls to 57°, it is not necessary to operate the mechanical refrigerating system and it may be shut off. The sprays may be also turned off at this time. When the dew point temperature of the outdoor air falls to 40°, indicating that humidification rather than dehumidification of the air is required it is necessary to turn the sprays on again but it is not necessary to turn on the mechanical refrigeration system. Therefore, I have provided an economizer unit for measuring the dew point temperature of the outdoor air and shutting off the mechanical refrigeration system and sprays when the dew point temperature of the outdoor air is between 40° F. and 57° F., and again turning the sprays on when the dew point temperature of the outdoor air is below 40° F.

Numeral 215 designates a sampling unit which is substantially identical with the sampling unit 85, the unit 215 taking a sample of air entering the duct 10. Inasmuch as the elements of the sample unit 215 are substantially identical with those of the sample unit 85, they have the same reference numbers with the identifying letter a. The duct 86a of sampling unit 215 may have one or more openings through which air from the duct 10 may be taken into the sampling unit. As in sampling unit 85 the dry bulb temperature of the air taken through the sampling unit is maintained at a constant value which may be 95° F., for example. The bellows 121a of sampling unit 215 operates a stem into engagement with which a pivoted lever 216 is normally urged by a coil spring 217. The lever 216 carries three mercury switches 218, 219 and 220. The mercury switches 219 and 220 have electrodes at their left ends and these mercury switches are closed when the bellows 121a expands in response to a rise in wet bulb temperature. The mercury switch 218 has electrodes at its right end and this switch closes in response to a fall of wet bulb temperature affecting the bulb 115a. Wet bulb temperature in the duct 89a of 63.5° F. corresponds to a dew point temperature of the outdoor air of 40° F. Similarly, a wet bulb temperature of 70° affecting bulb 115a corresponds to a dew point temperature of the outdoor air of nearly 57° F. The mercury switches 218, 219 and 220, as will presently be described, control the motor of the circulating pump 17 and the winding 207 controlling the valve 200. The winding 207 and the motor of pump 17 are normally energized through circuits which will be traced hereinafter, but are deenergized when the wet bulb temperature affecting bulb 115a drops to 70° F. indicating that the dew point temperature of the outdoor air is 57° F. When the winding 207 is deenergized, communication between pipes 180 and 206 is cut off and pipe 206 is connected to atmosphere, as above described. This relieves the pressure acting on valves 42 and 52 and the bellows 60 and as a result valve 51 closes, that is, moves to its minimum position, valve 42 opens and switch 59 is opened so as to completely shut down the mechanical refrigeration system.

The wet bulb controller of the unit 215 is so arranged that when the wet bulb temperature falls below 63.5° indicating that the dew point temperature of the outdoor air is 40° F., mercury switch 218 is closed and, as will presently be described, the motor of pump 17 is reenergized without energizing winding 207.

*Operation*

With the parts in the position shown, the system is operating under maximum demands for dehumidification. The mechanical refrigeration system is operating at maximum capacity with the steam valve 51 wide open; the by-pass valve 42 closed; the pump 17 is in operation pumping refrigerated water to the sprays 16 from the tank 20 and the dampers associated with the dryer units are positioned to cause substantially all of the air to pass over the drying units and none of it through the by-passes. Under these circumstances, the member 129 of controller 120 will be so positioned with respect to the bleed port that a pressure will be delivered to the relay 140 of substantially 15 pounds per square inch and the relay 140 will be delivering pressure of 15 pounds per square inch or nearly so to the pipe 142 and to the various control devices.

Assume now that the dehumidifying load gradually decreases from maximum until there is no dehumidifying load but rather humidification of the air is required. As the dehumidifying requirements decrease, the wet bulb controller 115 in response to dropping wet bulb temperature will cause the controller 120 to deliver a decrease in pressure value to the relay 140 and to the pipe 142 in the manner described above. The first effect of the decrease in pressure in pipe 142 will be at the relay 151. As the pressure acting on the diaphragm of this relay decreases from 13 pounds per square inch to 8 pounds per square inch, the pressure delivered to pipe 180 will decrease from 13 pounds per square inch to substantially 2 pounds per square inch in the manner already described. As the pressure in pipe 206 decreases from 13 pounds per square inch to 6 pounds per square inch, the valve 51 will be moved to a minimum position. As the pressure in pipe 206 decreases from 6 pounds per square inch to 2 pounds per square inch, the by-pass valve 42 will be gradually moved from a closed to a wide open position. As valve 51 closes, the speed of the turbine is reduced to reduce the refrigerating capacity and as the valve 42 opens the refrigerating capacity is further reduced. When the pressure in pipe 206 has fallen to 2 pounds per square inch the mercury switch 59 will open to deenergize and close the solenoid valve 55 so as to discontinue the governing action of valve 52. At this time the mechanical refrigeration system will be completely shut down.

As the pressure delivered by pipe 142 continues to decrease between substantially 9 pounds per square inch and 7 pounds per square inch, the relay 190 will respond in the manner above described to reduce the pressure delivered by pipe 193 from substantially 13 pounds per square inch to 2 pounds per square inch. Thus the face and by-pass dampers 76 will be moved from the position shown to one wherein substantially no air is passed over the dryer unit 65 and all of it is by-passed. When the pressure delivered by pipe 193 has fallen to 2 pounds, mercury switch 71 will be open and dryer unit 65 will be completely shut off.

From the foregoing it will be seen that the relay 190 responds so as to begin to throttle the dryer unit 65 slightly before the mechanical refrigeration system is completely shut off. In other words, there is a small amount of overlap.

As the pressure delivered by pipe 142 continues to fall between substantially 8 pounds per square inch and 6 pounds per square inch, the relay 191 will respond so as to reduce the pressure delivered by pipe 197 from substantially 13 pounds per square inch to 2 pounds per square inch. Thus the damper motor 78 will move the face and by-pass dampers 76a from the position shown in the drawings to one where substantially no air is passed over the dryer unit 68 and all of it is by-passed. When the pressure delivered to bellows 68a has fallen to 2 pounds per square inch, mercury switch 71a will be opened and dryer unit 66 will be completely shut off.

As is apparent the relay 191 responds so as to begin throttling dryer unit 66 slightly before the dryer unit 65 is completely throttled. In other words, there is a small amount of overlapping.

As the pressure delivered by pipe 142 continues to decrease, when it reaches 4 pounds the valve 29 will start opening and when the pressure has decreased to 2 pounds per square inch the valve 29 will be fully open so as to heat the water in tank 18 to provide for maximum humidification.

In response to increasing load requirements the sequence of operation is the reverse of that just described. In other words, first the valve 29 would be closed and then as demand for humidification increased the dryer unit 66 would first be graduatingly put in operation; then the dryer unit 65 and finally the mechanical refrigeration system would have its capacity gradually increased in accordance with requirements.

During normal operation the motor of pump 17 is energized through the following circuit: from line conductor 230 through wire 231, wire 232, mercury switch 219, wire 233, wire 234, wire 235, the motor of pump 17, wire 236, and wire 237 back to line conductor 238, the line conductors 230 and 238 being connected to any suitable source of power, not shown. During normal operation the winding 207 of the valve 200 is energized through the following circuit: from line conductor 230 through wire 231, wire 232, wire 240, mercury switch 220, wire 241, winding 207, wire 242, wire 237 back to line conductor 238.

Assume now that during normal operation the dew point temperature of the outdoor air falls to 57° F., so that the wet bulb temperature affecting controller 115a falls to 70° F. At this wet bulb temperature the mercury switches 219 and 220 will be opened as above described, interrupting the above described circuits for the motor of pump 17 and winding 207, stopping the pump and causing the three-way valve 200 to assume its other position wherein the mechanical refrigerating system is shut down. The system will remain in this condition as far as the pump 17 and the refrigerating apparatus are concerned until the dew point temperature of the outdoor air again rises above 57° F., or until it falls below 40° F. If it falls below 40° F., humidification is required and under these circumstances the wet bulb temperature affecting bulb 115a will be at or below 63.5°, which will cause closure of mercury switch 218 as above described. Closure of this switch will energize the motor of pump 17 through the following circuit: from line conductor 230 through wire 231, wire 243, mercury switch 218, wire 244, wire 234, wire 235, the motor of pump 17, wire 236, and wire 237 back to line conductor 238. Completion of this circuit will reenergize the motor of the pump 17 and operation of the sprays will be reinitiated for purposes of humidification rather than dehumidification.

From the foregoing it is to be seen that the economizer unit responds to the dew point of outdoor air and interrupts operation of the mechanical refrigerating system when it is not necessary for proper maintenance of the dew point temperature of the air passing to the blast furnace.

From the foregoing description of the structural arrangement and operation of my invention, those skilled in the art will appreciate that I have provided a unique and novel arrangement for measuring the dew point temperature of unsaturated air. The arrangement also provides very flexible means and arrangements for varying the capacity of the air treating means in accordance with load requirements and the controls used are of such a nature that these wide variations in the capacity of the treating apparatus will be made while maintaining the dew point temperature very accurately at a constant value.

Referring to Fig. 2 of the drawings, this figure represents a slight modification of the invention which would be utilized when controlling the dew point of air without using the dryer units of Fig. 1. In Fig. 2, the duct is represented by the numeral 250 and the spray pipe by the numeral 251 and the spray nozzles by the numeral 252. The sprays of Fig. 2 may form part of a system substantially the same as that of Fig. 1 without the dryer units. Thus under these circumstances, the air beyond the sprays is substantially saturated and the dew point temperature of this air is always its dry bulb temperature which may be measured by the dry bulb 254 which may be connected by a tube 255 to a controller like the controller 120 shown in Fig. 1. Thus the arrangement of Fig. 2 without the dryer units would eliminate the need for the sampling unit which measures the dew point of the air beyond the dryer units.

Referring to Fig. 4 of the drawings, I have shown another form of my invention which is similar to the form shown in Fig. 1 but is somewhat simplified and utilizes a somewhat different control arrangement. In Fig. 4, those parts which are identical with similar corresponding parts in Fig. 1 are numbered the same and the description thereof therefore will not be repeated. The form of the invention of Fig. 4 has the sprays 16 in the duct 10 the same as in Fig. 1, and in the present form of the invention a single dryer unit 65 is used. The present embodiment of the invention utilizes a mechanical refrigeration system as in Fig. 1, the steam turbine 47 driving a compressor 31 which is connected to a condenser 33 and an evaporator, the evaporator being disposed in a tank 20, as in Fig. 1.

In the present embodiment of the invention the governor valve 52 which governs the speed of the turbine is controlled by a solenoid valve 55, and in the present embodiment of the invention the valve 55 is controlled by a wet bulb controller 410. The wet bulb controller 410, comprises a pressure responsive switch 409, the pressure responsive element of which is connected to a bulb 412 by a tube 413. The bulb and tube are filled with an expansible liquid which expands and contracts developing a pressure depending upon the temperature affecting the bulb 412. Draped over the bulb 412 is a piece of porous fabric 414 forming a wick, the lower edges of the wick depending into a pan of water 415 so that water rises through the wick by capillary attraction and some of the water evaporates in the vicinity of the bulb 412 so that its temperature is depressed below the dry bulb temperature by an amount dependent upon the moisture content of the air passing through the duct 10. The wet bulb controller 410 closes the switch 409 upon rise in wet bulb temperature and opens it when the wet bulb temperature falls to a predetermined relatively low value. When the switch opens, an electrical circuit for the solenoid valve 55 indicated by the broken line is interrupted and the valve 55 is deenergized. When the valve 55 is closed, the flow of hydraulic fluid through the tube 54 is stopped and the valve 55 assumes closed position stopping the flow of steam to the turbine 47 and thus discontinuing its operation. In other words, the mechanical refrigerating system is shut off when the wet bulb temperature of the air being treated is at a relatively low value at which the proper dew point temperature of the treated air can be maintained by the dryer unit alone.

The present embodiment of the invention includes a steam coil 416 located beyond the dryer unit 65 to which steam is supplied through a pipe 417. Disposed in the pipe 417 is a pneumatic control valve 418 which is like the valve 92 of Fig. 1 and which is a normally open valve, closing upon an increase in pressure affecting the operating motor thereof and opening upon a decrease in pressure. The valve 418 is controlled by a pneumatic thermostat 419 which is exactly like the thermostat 93 of Fig. 1. The thermostat 419 is connected to the valve 418 by a tube 420 and the thermostat includes a bulb 421 disposed in the duct 12 connected to the casing of the thermostat by a tube 422. The thermostat 419 operates the same as the thermostat 93 of Fig. 1 causing the valve 418 to close upon increase in temperature in the duct 12 and to open upon decrease in temperature so as to maintain a predetermined dry bulb temperature in the duct 12.

The present embodiment of the invention also includes a steam coil 430 for preheating the air, disposed ahead of the sprays 16. Steam is supplied to the coil 430 through a pipe 431 and interposed in this pipe is a pneumatic valve 432. The valve 432 is like the valve 29 of Fig. 1, this valve being a normally open valve which closes upon an increase in pressure applied to the operating motor thereof and opens upon a decrease in pressure. The valve 432 is arranged to be closed when the control pressure applied thereto is above 4 pounds per square inch, for example, the valve 432 moving from closed position to open position when the pressure applied thereto decreases from 4 pounds per square inch to 2 pounds per square inch.

The dryer unit 65 of the present embodiment has face and by-pass dampers 76 associated therewith the same as in Fig. 1, the dampers being operated by a damper motor 78 like that of Fig. 1.

The controls for the present embodiment of the invention include the controller 120 the same as the one of Fig. 1 which is controlled by a wet bulb controller including a wet bulb 115 disposed in the duct 12, the wet bulb 115 corresponding to and being the same as the wet bulb 115 of Fig. 1. In the present embodiment the sampling unit of Fig. 1 is not utilized so the wet bulb 115 is disposed directly in the duct 12.

The pipe through which a controlled pressure is delivered from the controller 120 is designated by the numeral 137. This pipe is connected to a pipe 435 which connects to a pipe 436 connected to the operating motor of valve 432. The pipe 435 also connects with a pipe 437 connected to the bellows 79 of damper motor 78. The pipe 137 also connects to a pipe 138 which is in turn connected to the diaphragm chamber of a relay 140 which is the same as the relay 140 of Fig. 1. The control pressure delivered by the relay 140 is delivered to the valve 51 through a pipe 438.

The present embodiment of the invention includes a pneumatic thermostat 445 which is structurally the same as the thermostat 93 of Fig. 1, this thermostat having associated therewith a thermal bulb 446 containing an expansible liquid connected to the thermostat casing by a tube 447. The thermostatic bulb 446 is disposed in the path of the air beyond the sprays 16 which is substantially saturated so that the bulb 446 measures the dew point temperature of the air beyond the sprays. The thermostat 445 is connected to the valve 51 by a pipe 448. The thermostat 445, in response to the bulb 446, in the present embodiment of the invention acts as a dew point controller so as to maintain a constant dew point temperature of the saturated air beyond the sprays. In other words, in response to rise in temperature affecting the bulb 446, the thermostat 445 delivers a pressure to the valve 51 tending to open the valve and in response to fall in temperature affecting the bulb 446 pressure is delivered to the valve 51 tending to cause it to move in closing direction whereby a predetermined dew point temperature is maintained beyond the sprays 16.

In operation, in the present embodiment of the invention the thermostat 445 normally maintains a constant dew point temperature of air passing to the discharge duct 12 of the fan 11. The controller 120 in response to the wet bulb 115 controls the wet bulb temperature in the duct 12. As in the previous embodiment of the invention that is Fig. 1, when the requirements for dehumidification are at a maximum the dampers associated with the dryer unit 65 are in the position shown, the valve 51 is wide open so as to cause the mechanical refrigerating system to operate at a maximum capacity and the valve 432 is closed. Upon a decrease in requirements for dehumidification the wet bulb temperature affecting bulb 115 will tend to fall, and as a result the controller 120 will deliver a decrease in pressure through the pipe 137 as the dehumidifying requirements decrease. As the pressure delivered through pipe 137 decreases, the relay 140 will relieve the pressure applied to the valve 51 causing this valve to close, shutting off the mechanical refrigeration system. As the pressure delivered to pipe 137 through pipes 435, 436, and 437 continues to decrease, the bellows 79 of damper motor 78 will next be collapsed moving the face and by-pass dampers to a position wherein all of the air is by-passed through the by-pass, none of it passing over the dryer unit. As the load continues to decrease and it becomes necessary to humidify rather than dehumidify the air, the reduced pressure delivered through pipe 436 to valve 432 will cause this valve to open and to heat the air passing through the duct 10. The heated air will take up moisture from the sprays 16 so as to humidify the air and thus to maintain the proper wet bulb temperature in the duct 12.

When the load changes in the opposite direction the above described sequence will of course take place in reverse order, the valve 432 first closing, the face and by-pass dampers 76 then moving into the position shown on Fig. 4 and the valve 51 then opening.

During normal operation, the coil 416 in response to the thermostat 419 will maintain a constant dry bulb temperature in the duct 12 so that both the wet and dry bulb temperatures in this duct are controlled.

As previously pointed out, when the wet bulb temperature in the air being admitted to the duct 10 falls to a predetermined low value, the mechanical refrigerating system is shut off so that the dehumidifying requirements are then taken care of by the dryer unit 65 alone.

Referring to Fig. 5 of the drawings, I have shown another modified form of my invention which is similar to that of previous embodiments. This embodiment of the invention uses the sampling unit 85 of Fig. 1 but does not use the dryer units of Fig. 1. In the present embodiment of the invention the sampling unit 85 is the same as that of Fig. 1 except that the inlets 87 to the sampling unit are disposed in the duct 12 beyond the fan 11 instead of ahead of it as in Fig. 1. The parts of the sampling unit are otherwise the same as in Fig. 1 and are numbered the same.

In the present embodiment of the invention the sprays 16 are used the same as in Fig. 1. Brine is utilized for the sprays and it is pumped to the sprays by a centrifugal pump 17, the inlet of which is connected by a pipe 510 to a pneumatically operated three-way valve 511. One of the other ports of the three-way valve is connected to a brine storage tank 512 by a pipe 513. The collecting pan 22 is connected to the brine storage tank by pipes 514 and 515 and to the other port of the three-way valve 511 by a by-pass pipe 516. From the foregoing it is apparent that the three-way valve 511 controls the relative proportions of brine which are by-passed and taken from the brine storage tank 512. The pneumatic valve 511 is arranged to increase the proportions of the brine taken from the storage tank and to decrease the proportion by-passed as the pressure applied to the valve increases. The opposite effect follows when the pressure applied to the valve decreases.

The brine in the storage tank 512 is cooled by a refrigeration system including a compressor 520 connected to a condenser 521 by a pipe 522. The condenser is connected to an evaporator coil in a brine cooling tank 523 by a pipe 524 and interposed in the pipe 524 is an expansion valve 525 which may be of the conventional type. The outlet of the evaporator coil is connected to the suction side of the compressor by a pipe 526. Brine may be circulated between the storage tank 512 and the cooling tank 525 by pipes 527 and 528.

The motor of the compressor is controlled by a thermostatic switch designated by the numeral 530 comprising a pressure operated switch 531, the pressure responsive element of which is connected to a thermal bulb 532 by a tube 533, the bulb 532 being disposed in the brine in tank 512. The thermostatic switch 530 controls the compressor motor through an electrical circuit indicated by the broken line in a well known manner to maintain the temperature of the brine in the storage tank at a predetermined value.

The present embodiment of the invention includes a steam coil 540 located in the duct 10 beyond the sprays for maintaining a predetermined dry bulb temperature of the air passing through the duct 12 as in the modification of Fig. 4. Steam is supplied to the coil 540 through a pipe 541 and interposed in this pipe is a pneumatic valve 542 which is of the same type as the valve 418 of Fig. 4. The valve 542 is controlled in the present embodiment of the invention by a controller 543 which is preferably of exactly the same type as the controller 120. The controller 543 has associated therewith a thermal bulb 544 disposed in the duct 12 and connected to the controller by a tube 545. Pneumatic pressure is supplied to the controller 543 through a tube 546 having a restriction 547 therein. Controller 543 may embody a relay like relay 140 of Fig. 1. A controlled pressure is delivered from the controller 543 by a tube 548 to the valve 542. The controller 543 in response to the thermal bulb 544 controls the valve 542 so as to maintain a predetermined dry bulb temperature in the duct 12, the operation being the same as has been described in the foregoing in connection with similar corresponding controllers.

In the present embodiment of the invention, the controller 120 does not control the refrigeration system itself but instead it controls the valve 511, the controller 120 delivering a controlled pressure to the valve 511 through a pipe 550. As shown controller 120 has a pointer and scale graduated-dew point temperature. A recording chart may also be provided in this instrument and the corresponding instruments of other modifications may be similarly equipped.

In normal operation, the compressor 520 is operated to keep the brine in the storage tank 512 at a predetermined temperature and the dry bulb temperature in duct 12 is maintained constant by the controller 543. The wet bulb 115 of the sampling unit 85 measures the dew point temperature the same as in the embodiment of Fig. 1, and thus the controller 120 controls the temperature of the brine delivered to the sprays 16 in accordance with the dew point temperature of the air in duct 12.

When the dehumidifying load is maximum the controller 120 is delivering a relatively high pressure through the pipe 550 of substantially 15 pounds per square inch and under these circumstances the three-way valve 511 is in a position to cause a large proportion of brine from the tank 512 to be pumped to the sprays 16 and practically none to be by-passed. As the dehumidifying load decreases, pressure delivered to pipe 550 decreases, as explained in connection with Fig. 1. This causes the valve 511 to move towards a position wherein a small proportion of brine is taken from the tank 512 and a larger proportion is by-passed so that brine at a higher temperature is delivered to the sprays 16. In response to increasing dehumidifying loads the pressure delivered through pipe 550 of course increases and valve 511 is operated in the opposite direction to increase the proportion of water taken from the tank 512 and to decrease the proportion by-passed. In this manner the controller 120 controls the valve 511 so as to maintain a constant dew point temperature of the air in the duct 12.

The forms of my invention which I have disclosed in detail are representative of preferred manners of adapting it. Various modifications will occur to those who are skilled in the art and hence my invention is to be limited not by any disclosure but only in accordance with the claims appended hereto.

I claim as my invention:

1. In an air conditioning system, in combination, air treating means including means employing mechanical refrigeration for cooling and substantially saturating the air, means for drying said air so that it is not saturated by removing moisture therefrom without commensurately lowering its temperature, means for measuring the dew point of the unsaturated air, said last means being arranged to control said first means so as to maintain the air at a constant dew point.

2. In an air conditioning system, in combination, air treating means including means for cooling and substantially saturating the air, means for drying the air by removing moisture therefrom so that it is no longer saturated, means for measuring the dew point of the unsaturated air, said dew point measuring means being arranged to control said first means to maintain the air at constant dew point temperature, and means for measuring the dew point of the air to be treated for interrupting operation of the cooling means when the dew point of the air to be treated is such that the drying means is adequate to maintain the dew point of the treated air.

3. In an air conditioning system, in combination, air treating apparatus including means for cooling and dehumidifying air, said means being arranged to substantially saturate the air, said air treating apparatus including means for drying the air after it has been saturated, means responsive to the temperature of the saturated air controlling the air cooling and dehumidifying means, and means for measuring the dew point temperature of the air beyond the drying means controlling the complete air treating apparatus to maintain the air at constant dew point.

4. In an air conditioning system, in combination, air treating apparatus including means for cooling and dehumidifying air, said means being arranged to substantially saturate the air, said air treating apparatus including means for drying the air after it has been saturated, means responsive to the temperature of the saturated air controlling at least a portion of the air treating apparatus, means for measuring the dew point temperature of the air beyond the drying means controlling at least a portion of the air treating apparatus to maintain the air at constant dew point, and means responsive to moisture content of the air to be treated arranged to reduce the capacity of the cooling means when the moisture content of the air to be treated decreases.

5. In an air conditioning system, in combination, air treating apparatus including means for cooling and dehumidifying air, said means being arranged to substantially saturate the air, said apparatus including means for drying the air after it has been saturated, means for measuring the dew point of the treated air for controlling the air treating apparatus to maintain a constant dew point, and means responsive to moisture content of the air to be treated for reducing the capacity of the cooling means when the moisture content of the air to be treated decreases.

6. In an air conditioning system, in combination, air treating apparatus for varying the moisture content of the air, said apparatus comprising first means including cooling means for removing moisture from the air, and second means for removing moisture from the air, means controlling said first and second means to maintain the dew point of said conditioned air substantially constant, and means responsive to the dew point of the air to be conditioned for rendering said cooling means inoperative when the dew point of the air to be conditioned is such that said second means is capable of removing sufficient moisture to bring the air to the desired dew point.

7. In an air conditioning system, in combination, means for cooling the air and producing substantial saturation thereof, means for drying the air after it has been saturated, means responsive to the wet bulb temperature of air after it has been dried, and control means operated by said last mentioned means in response to a decrease in said wet bulb temperature for gradually decreasing the effectiveness of said cooling means and then decreasing the effectiveness of said drying means for maintaining the wet bulb temperature of said conditioned air substantially constant.

8. In an air conditioning system, in combination, means for cooling the air and producing substantial saturation thereof, means for drying the air after it has been saturated, means responsive to the moisture content of air after it has been dried, control means operated by said last mentioned means in response to a decrease in said moisture content for gradually decreasing the effectiveness of said cooling means and then decreasing the effectiveness of said drying means, and means responsive to the moisture content of the air to be conditioned for rendering said cooling means inoperative when said air to be conditioned in sufficiently dry so that said drying means is capable of bringing it to the proper moisture content.

9. In an air conditioning system, in combination, a chamber through which the air to be conditioned passes, refrigeration means for removing moisture from the air by reducing it below its dew point temperature, additional means for removing moisture from the air, and means responsive to the moisture in the conditioned air for gradually decreasing the amount of cooling accomplished by said refrigeration means and then gradually reducing the effectiveness of said additional moisture removing means, said moisture responsive means performing the above function in response to a continued decrease in the moisture in said conditioned air.

10. In an air conditioning system, in combination, a chamber through which the air to be conditioned passes, refrigeration means for removing moisture from the air by reducing it below its dew point temperature, additional means for removing moisture from the air, means responsive to the moisture in the conditioned air for gradually decreasing the amount of cooling accomplished by said refrigeration means and then gradually reducing the effectiveness of said additional moisture removing means, said moisture responsive means performing the above functions in response to a continued decrease in the moisture in said conditioned air, and means responsive to the moisture content of the air to be conditioned for rendering said refrigeration means inoperative when it is not needed for maintaining the moisture content of the conditioned air below the desired value.

11. In an air conditioning system, in combination, a chamber through which the air to be conditioned passes, refrigeration means for removing moisture from the air by reducing it below its dew point temperature, additional means for removing moisture from the air, said last mentioned means comprising drying means capable of absorbing moisture from the air as it passes over said drying means and means for by-passing air around said drying means, and means operative in response to a continued decrease in the moisture content of the conditioned air for first increasing the temperature of said refrigeration means and then gradually operating said by-passing means to cause increased amounts of air to by pass said drying means.

12. In an air conditioning system, in combination, a chamber through which the air to be conditioned passes, refrigeration means for removing moisture from the air by reducing it below its dew point temperature, additional means for removing moisture from the air, said last mentioned means comprising drying means capable of absorbing moisture from the air as it passes over said drying means and means for by-passing air around said drying means, means operative in response to a continued decrease in the moisture content of the conditioned air for first increasing the temperature of said refrigeration means and then gradually operating said by-passing means to cause increased amounts of air to by pass said drying means, and means responsive to the moisture content of the air to be conditioned for rendering said cooling means inoperative when said air to be conditioned is sufficiently dry so that said drying means is capable of bringing it to the proper moisture content.

WILLIAM L. McGRATH.